J. R. RYAN.
POULTRY FEEDER.
APPLICATION FILED FEB. 16, 1909.
938,342.
Patented Oct. 26, 1909.
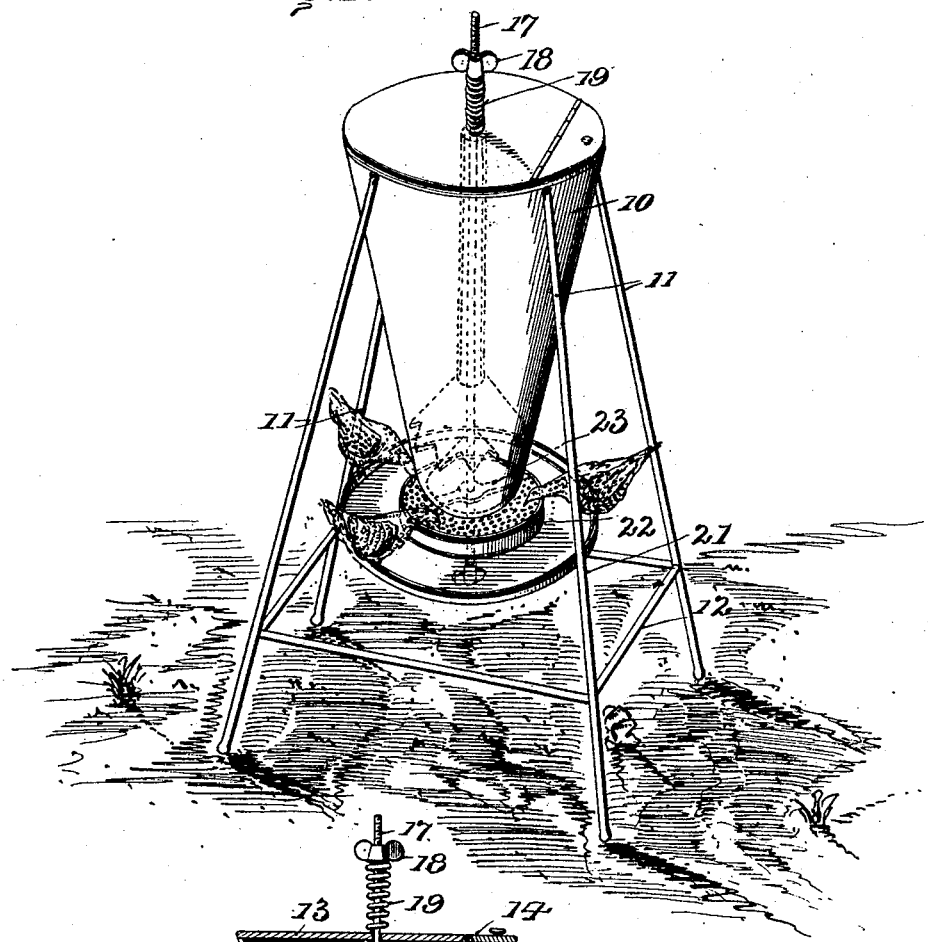
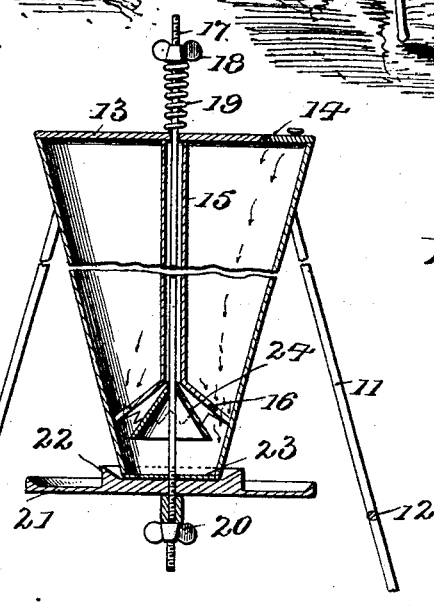
Witnesses
Inventor
James R. Ryan
By ___, Attorneys.

UNITED STATES PATENT OFFICE.

JAMES R. RYAN, OF SAULT STE. MARIE, MICHIGAN.

POULTRY-FEEDER.

938,342.

Specification of Letters Patent.  Patented Oct. 26, 1909.

Application filed February 16, 1909. Serial No. 478,172.

*To all whom it may concern:*

Be it known that I, JAMES R. RYAN, citizen of the United States, residing at Sault Ste. Marie, in the county of Chippewa and State of Michigan, have invented certain new and useful Improvements in Poultry-Feeders, of which the following is a specification.

This invention relates to the care of live stock and refers particularly to a device for feeding and exercising poultry.

An object of this invention is to construct a device which will automatically feed predetermined amounts of grain to poultry upon the actuation of the device by the alighting of the poultry upon a platform formed thereon and for the purpose of discontinuing the supply of grain until the removal of the poultry from the platform when the poultry is required to re-alight thereon.

The invention has for another object the provision of a device of this character which comprises but few parts and which thereby produces a device which is of simple construction and one which can be easily cleaned and operated and which may also be adjusted to various circumstances under which the same is adapted to be used.

For a full understanding of the invention reference is to be had to the following description and accompanying drawings, in which, Figure 1 is a perspective view of the complete device disclosing the same in an open position. Fig. 2 is a vertical central section through the device showing the same closed in a normal position.

Corresponding and like parts are referred to in the following description and indicated in both views of the drawings by the same reference characters.

Referring to the drawings, the numeral 10 designates a hopper which is supported upon standards 11 which are diverged downwardly in rectangular formation and are held in such position by means of brace rods 12 disposed between the same adjacent their lower ends. The hopper 10 is provided with a cover 13 which is provided with a hinged portion 14 adjacent one side thereof into which is adapted to be introduced the grain to be fed to the poultry.

Centrally disposed within the hopper 10 is a tube 15 which is flared outwardly at its lower extremity and is provided with a plurality of cut-away portions or passages 16 which lie adjacent the inner wall of the hopper 10 and serve the purpose of admitting of a steady flow of grain therethrough. Loosely mounted within the tube 15 is a rod 17 which is provided upon its upper extremity, which is extended through the cover 13, with a winged-nut 18 adapted for adjustably compressing a coil spring 19 about the rod 17 against the upper face of the cover 13 in order to secure the rod 17 normally in an upward position. The lower extremity of the rod 17 is threaded and provided with a winged-nut 20 which engages upon the under face of a platform 21 which is carried upon the rod 17 and which is provided upon its upper face with a tray 22 for engagement against the lower open extremity of the hopper 10. The lower end of the hopper 10 carries a guide 23 which is disposed about the lower end of the rod 17 and is adapted to retain the same in a substantially vertical position throughout the operation of the same.

The hopper 10 is provided at its lower end with a valve 24 which is rigidly disposed upon the rod 17 between the flared extremity of the tube 15 and the guide 23 and which is adapted to reciprocate between the same. The valve 24 comprises a portion of metal which is bent into conical formation and which is secured at its apex about the rod 17 and is of such dimensions as to snugly engage the lower end of the hopper 10 to shut off the flow of grain upon the depression of the same.

The operation of the device is as follows:—The device when normally positioned is closed, by reason of the spring 19 engaging the thumb nut 18 and holding the rod 17 upwardly to impinge the tray 22 against the bottom of the hopper 10. When the fowl desires to gain access to the grain the same is compelled to mount the platform 21, which will be depressed by the weight of the fowl, owing to the regulation of the tension of the spring 19, which will draw the tray 22 downwardly from the bottom of the hopper 10 and permit of a quantity of the grain, which is disposed between the tray 22 and the valve 24 to remain in the tray whereby the fowl is enabled to partake of the same. The valve 24 when depressed engages in the lower extremity of the hopper 10 and prevents the falling of grain therefrom upon the tray 22 until the fowl alights from the platform 21 and permits the spring 19 to raise the valve 24 and tray 22 into normal position.

It is readily understood from the construction of the device that when in a normal position the grain passes through the openings 16 in the flared extremity of the tube 15 and falls upon the tray 22 which is impinged against the bottom of the hopper 10. It is seen from this operation that the amount of grain which is fed upon each depression of the tray 22 is measured and regulated by the distance between the valve 24 and the tray 22.

Having thus described the invention what is claimed as new is:—

1. In a feeder as specified, the combination of a frame, a hopper mounted in said frame, a tube rigidly and vertically disposed in said hopper, a flared lower extremity on said tube having cut away portions and engaged at its outer edge to said hopper, a rod disposed through said tube, a spring adjustably positioned upon the upper end of said rod for engagement with the cover of said hopper, a platform adjustably carried on the end of said rod, a tray carried by said platform and adapted for engagement againt the lower end of said hopper, and an inverted conical valve mounted on said rod within said hopper beneath said flared portion and adapted to close the lower end of the hopper upon the depression of said rod.

2. In combination, a hopper, a platform mounted beneath said hopper, a rod upwardly extended from said platform through said hopper, a spring carried by said rod and adjustably engaged against the cover of said hopper, a tray mounted on said platform and engaged against the lower end of said hopper, a tube rigidly disposed about said rod in said hopper, and a valve carried by said rod to close said hopper upon the depression thereof.

3. In combination, a hopper, a tube vertically disposed in said hopper, a rod reciprocably mounted in said tube, a spring carried upon said rod to normally retain the same in an upward position, a platform adjustably mounted on said rod against the lower end of said hopper, a tray integrally formed on said platform to engage said hopper, and a valve carried by said rod in said hopper to close the lower end thereof upon the depression of said rod.

In testimony whereof I affix my signature in presence of two witnesses.

JAMES R. RYAN. [L. S.]

Witnesses:
 JOHN H. WATSON,
 LAWRENCE G. MUEHLING.